United States Patent [19]

Poldner

[11] Patent Number: 4,552,283

[45] Date of Patent: Nov. 12, 1985

[54] SAFETY DEVICE FOR CLAMPING SCREWS ON PRESSURIZED FLUID RECEPTACLES

[75] Inventor: Erich Poldner, Benningen, Fed. Rep. of Germany

[73] Assignee: Filterwerk Mann & Hummel GmbH, Ludwigsburg, Fed. Rep. of Germany

[21] Appl. No.: 672,672

[22] Filed: Nov. 19, 1984

[30] Foreign Application Priority Data

Nov. 18, 1983 [DE] Fed. Rep. of Germany ....... 3341675

[51] Int. Cl.⁴ .............................................. B65D 53/00
[52] U.S. Cl. .................................... 220/304; 220/206; 220/303
[58] Field of Search ............... 220/206, 284, 288, 303, 220/304

[56] References Cited

U.S. PATENT DOCUMENTS 2,784,865  3/1957  Rieke ................................... 220/303
3,243,071  3/1966  Kimmel ............................... 220/304
3,302,664  2/1967  Plamann .............................. 220/304

Primary Examiner—George T. Hall
Attorney, Agent, or Firm—Joseph A. Geiger

[57] ABSTRACT

A safety device for the clamping screws of pressurized fluid receptacles comprising an internally faceted socket recess in the head of the clamping screw and a threaded axial bore in its shaft. Into the latter is screwed a bleed screw the head of which occupies the socket of the clamping screw. The need to unscrew the bleed screw to gain access to the socket of the clamping screw prevents the inadvertent unscrewing of the clamping screw under pressure by alerting the operator to the presence of pressure, as the bleed screw opens a bleed channel and thereby creates a small fluid leak. The bleed channel extends alongside the threaded axial bore in the clamping screw and is normally closed by the head of the bleed screw.

7 Claims, 2 Drawing Figures

SAFETY DEVICE FOR CLAMPING SCREWS ON PRESSURIZED FLUID RECEPTACLES

BACKGROUND OF THE INVENTION

1. Field of the Invention

The present invention relates to openable, screw-clamped pressurized receptacles for flammable and other dangerous fluids and, more particularly, to a safety device for the clamping screw, or screws, of a pressurized fluid receptacle which is designed to prevent the inadvertent loosening of the screw from the receptacles under internal fluid pressure.

2. Description of the Prior Art

Certain receptacles for pressurized fluids, particularly the housings of liquid filters which operate under pressure, need to be of the screw-clamped type, so as to be accessible through the removal of a housing half or housing cover. This applies especially to filters for fuel and other flammable liquids and to filters for hot and/or chemically aggressive liquids, for example.

Serious damage, including personal injury, can result from the inadvertent opening of such a fluid receptacle while under pressure. The accident risk is particularly high in the case of fuel filters which have a filter housing consisting of a housing base and a housing cap clamped to the housing base by means of a single central clamping screw.

An inadvertent person who proceeds to unscrew the central clamping screw of the fuel filter under pressure would find pressurized fuel squirting from all sides of the filter housing which, if the spill is taking place in the vicinity of a hot internal combustion engine, for example, could easily result in a serious accident.

The elimination of this risk calls for a safety device which is capable of positively preventing the inadvertent unscrewing of the clamping screw, or screws from the pressurized receptacle. Such a safety device is preferably so designed than an attempted removal of the device for access to the clamping screw clearly signals the presence of pressure in the receptacle by opening a tiny bleed passage through which a small amount of pressurized fluid is released. This warning release permits the operator to immediately reset the safety device.

A device which operates in this fashion is known from the German Offenlegungsschrift No. 32 17 371. This prior art safety device, intended for use in conjunction with fuel filters of marine engines, features a safety cap which, in its normal position, surrounds the hexagonal head of the filter clampin screw. A threaded shaft, extending from the inner end wall of the safety cap, engages a threaded throughbore of the clamping screw.

The safety cap can be raised by unscrewing it from the clamping screw to expose the facets of the clamping screw for engagement by a wrench. The action of unscrewing the safety cap establishes a bleed passage connecting the inner end of the throughbore of the clamping screw with the outside. This bleed passage is formed by an inclined bleed bore in the threaded shaft of the safety cap which leads from the outer extremity of the shaft to a point on the shaft which moves above a sealing face on the screw head, when the safety cap is unscrewed a certain distance.

An inwardly crimped edge on the lower extremity of the safety cap and a snap ring near the upper extremity of the clamping screw cooperate to render the safety cap captive of the clamping screw.

Among the shortcomings of the described prior art device are its complexity and cost, inasmuch as the device requires a deep-drawn cap part and a threaded shaft part with an upset head portion to which the cap part is resistance-welded. The consequent need for arranging the safety cap in a captive relationship with the clamping screw complicates the assembly operation, because it requires that the crimping operation on the edge of the safety cap be performed, after the safety cap is screwed onto the clamping screw.

SUMMARY OF THE INVENTION

Underlying the present invention is the primary objective of devising an improved safety device for clamping screws on pressurized fluid receptacles which is free of the above-mentioned shortcomings and especially suited for low-cost mass production.

The present invention proposes to attain this objective by suggesting a safety device for a clamping screw of a pressurized fluid receptacle, which features a clamping screw in the form of an internally faceted socket head cap screw with a threaded axial bore extending from its faceted recess into its threaded shaft and a bleed screw which is screwed into the threaded bore of the clamping screw, the head of the bleed screw occupying the socket of the clamping screw and thereby preventing the insertion of a clamping screw wrench, so as to make it necessary to first remove the bleed screw, before the clamping screw can be unscrewed.

The head of the tightened bleed screw closes off a bleed channel arranged between the shaft of the bleed screw and the threaded axial bore of the clamping screw, the bleed channel having an inlet which is open to the interior of the pressurized fluid receptacle and an outlet which is located underneath the head of the bleed screw. Accordingly, when the bleed screw is unscrewed, its head opens the bleed channel outlet, allowing a small flow of pressurized fluid to escape from the receptacle.

In a preferred embodiment of the invention, both the clamping screw and the smaller bleed screw are hexagon socket head cap screws, the bleed screw being preferably a regular, commercially available size, thus reducing the cost of the saftey device.

The invention further suggests a bleed channel inlet in the form of a radial bore in the shaft of the clamping screw. For receptacles holding easily flowing fluids, it may be adequate to use the thread clearance between the threaded bore of the clamping screw and the threaded shaft of the bleed screw as the axial portion of the bleed channel. For receptacles holding liquids of higher viscosity, the invention further suggests the arrangment of a longitudinal groove in the threaded bore of the clamping screw which serves as a longitudinal bleed channel portion.

The present invention thus offers a clamping screw safety device which is simple and effective, inasmuch as it reliably prevents the inadvertent unscrewing of the clamping screw from a pressurized receptacle by alerting the operator to the presence of pressure in the receptacle through a small controlled leak which he can quickly stop by retightening the bleed screw. The device readily lends itself for mass production.

Since the bleed screw is a regular commercially available fastener, it is not necessary for it to be arranged in a captive relationship to the clamping screw.

BRIEF DESCRIPTION OF THE DRAWINGS

Further special features and advantages of the invention will become apparent from the description following below, when taken together with the accompanying drawing which illustrates, by way of example, a preferred embodiment of the invention which is represented in the various figures as follows.

DESCRIPTION OF THE PREFERRED EMBODIMENT

Figure 1:
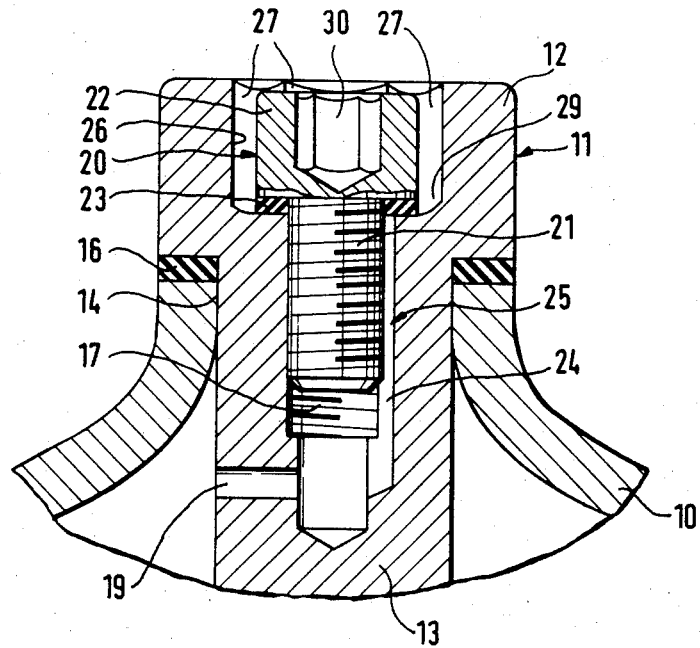
FIG. 1 shows, in a sectional view taken along a vertical plane, the upper portion of a removable part of a pressurized fluid receptacle with a clamping screw safety device embodying the present invention.
Figure 2:
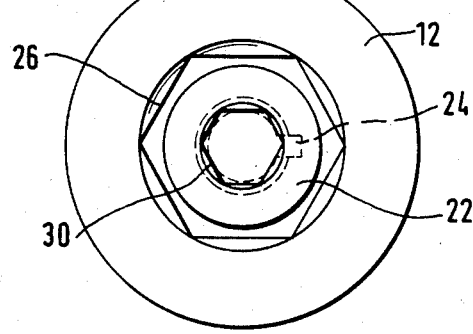
FIG. 2 shows the clamping screw safety device of FIG. 1 in a corresponding plan view.

FIG. 1 shows the neck portion 10 of a pressurized filter housing. The latter is of a known structure, consisting of a base portion and a bell-shaped cap portion of which the neck portion 10 represents the uppermost part. The cap portion of the housing is sealingly clamped to the base portion by means of a single central clamping screw 11 which extends vertically through a neck bore 14 in the neck portion 10.

The central clamping screw 11 has a screw head 12 and a screw shaft 13, the lower end portion of which is threaded (not shown). The threaded end portion of the clamping screw 11 cooperates with a threaded blind bore (likewise not shown) in the base portion of the filter housing to provide the desired clamping. The head 12 of clamping screw 11 presses downwardly against an end face of the neck portion 10, thereby compressing a gasket 16.

In the upper portion of the central clamping screw 11 is arranged a threaded axial bore 17 which communicates with the inside of the filter housing via a radial bore 19 near the lower end of the threaded bore 17. The radial bore 19 and a longitudinal groove 24 which runs alongside the threaded bore 17 form the radial and axial length portion of a bleed channel 25 leading from the inside of the filter housing to the central recess 29 of the screw head 12.

A bleed screw 20 has its threaded shaft 21 received in the threaded bore 17. A gasket 23 which is pressed against the bottom of the recess 29 by the head 22 of the bleed screw 20 seals off the upper ends of the threaded bore 17 and of the bleed channel 25.

The central clamping screw 11 of the safety device of the invention is a hexagon socket head cap screw, its recess 29 forming a hexagon socket 26 with six facets 27. The bleed screw 20 is likewise a hexagon socket head cap screw with a hexagon socket 30. The bleed screw 20 is preferably of the standardized commercially available type. FIG. 1 shows that, in its normal position in the recess 29, the head 22 of the bleed screw 20 prevents the insertion of a wrench into the hexagon socket 26 of the central clamping screw 11.

In order to unscrew the central clamping screw 11, it is therefore necessary to first remove the bleed screw 20 from the recess 29 of the clamping screw 11. As the bleed screw 20 is unscrewed, its head 22 opens the upper end of the bleed channel 25 inside the clamping screw 11. In the event that pressure is present inside the filter housing, this condition is signaled to the operator by a small leak of fluid into the recess 29. This leak alerts the operator to the presence of pressure in the filter and to the fact that the central clamping screw 11 must not be unscrewed from the filter housing, unless the pressure condition is removed first.

With minimal risk incurred as a result of this inadvertence, the operator can quickly retighten the bleed screw 20. The inadvertent opening of the pressurized filter housing and the escape of flammable liquid in jets that shoot in all directions is thereby safely prevented.

As can readily be ascertained from the drawing, it is not necessary for the bleed screw 20 of the novel safety device to be a hexagon socket head cap screw. In its place could also be used a slotted head cap screw or a cross-recessed head cap screw. Similarly, the socket of the central clamping screw 11 could be internally faceted in a shape other than the conventional hexagon shape, such as, for example, in a spline shape.

Lastly, it should be noted that the longitudinal portion of the bleed channel could also be arranged in the form of a longitudinal groove on the shaft of the bleed screw 20, or it could be dispensed with entirely, if the clearance between the male and female threads of the bleed screw 20 and the threaded bore 17, respectively, is made wide enough to serve as the longitudinal portion of the bleed channel.

It should be understood, of course, that the foregoing disclosure describes only a preferred embodiment of the invention and that it is intended to cover all changes and modifications of this example of the invention which fall within the scope of the appended claims.

I claim the following:

1. A safety device for a clamping screw on a pressurized fluid receptacle comprising in combination;
    a head and an adjoining threaded shaft defined by the clamping screw, the head having an internally faceted socket-type recess which is adapted for engagement by a matching wrench;
    a threaded axial bore in the clamping screw extending from the bottom of the faceted recess into the shaft of the clamping screw;
    a bleed screw having a threaded shaft and an adjoining head which, when the bleed screw is screwed into the threaded axial bore of the clamping screw, prevents access to the internally faceted recess by said wrench; and
    a bleed channel defined between the clamping screw and the bleed screw, the bleed channel having a bleed channel inlet which is open to the interior of the pressurized fluid receptacle and a bleed channel outlet which is located in the immediate vicinity of the head of the bleed screw, so that, when the bleed screw is screwed tight, its head closes off the bleed channel outlet, and, when the bleed screw is unscrewed, it initially allows only a small flow of pressurized fluid to escape through the bleed channel outlet.

2. A safety device as defined in claim 1, wherein
    the threaded axial bore in the clamping screw communicates through the shaft of the clamping screw with the interior of the pressurized fluid receptacle to form the bleed channel inlet and a first length portion of the bleed channel.

3. A safety device as defined in claim 2, wherein
    the threaded axial bore in the clamping screw communicates with the interior of the pressurized fluid receptacle through a radial bore in the shaft of the clamping screw.

4. A safety device as defined in claim 2, wherein
    the threaded axial bore in the clamping screw and the threaded shaft of the bleed screw define a thread clearance which forms a second length portion of the bleed channel.

5. A safety device as defined in claim 2, wherein
the clamping screw includes a longitudinal groove in its threaded axial bore which forms a second length portion of the bleed channel; and
one extremity of said longitudinal groove is located at the bottom of the faceted recess, underneath the head of the bleed screw, where said groove extremity forms the bleed channel outlet.

6. A safety device as defined in claim 1, wherein
both the clamping screw and the bleed screw are hexagon socket head cap screws;
the head of the bleed screw fits into the hexagon socket of the clamping screw, having an axial height which occupies substantially the entire depth of said clamping screw socket;
the socket of the clamping screw has a flat bottom portion surrounding its threaded axial bore;
the bleed channel outlet is located within said flat bottom portion; and
the head of the bleed screw includes a gasket with which it closes off the bleed channel outlet, when the bleed screw is tightened.

7. A safety device as defined in claim 6, wherein
the bleed screw is a standardized commercially available hexagon socket head cap screw.

* * * * *